Sept. 25, 1962     C. T. JACKSON     3,056,121

CONTROL PANEL FOR RAILWAY TRAFFIC CONTROLLING SYSTEMS

Filed May 19, 1959     5 Sheets-Sheet 1

INVENTOR.
C.T. JACKSON
BY
*Forest B. Hitchcock*
HIS ATTORNEY

Sept. 25, 1962 — C. T. JACKSON — 3,056,121
CONTROL PANEL FOR RAILWAY TRAFFIC CONTROLLING SYSTEMS
Filed May 19, 1959 — 5 Sheets-Sheet 2

INVENTOR.
C.T. JACKSON
BY
HIS ATTORNEY

Sept. 25, 1962　　　　　　　C. T. JACKSON　　　　　　3,056,121
CONTROL PANEL FOR RAILWAY TRAFFIC CONTROLLING SYSTEMS
Filed May 19, 1959　　　　　　　　　　　　　　　　5 Sheets-Sheet 3

INVENTOR.
C.T. JACKSON
BY
Forest B. Hitchcock
HIS ATTORNEY

Sept. 25, 1962   C. T. JACKSON   3,056,121
CONTROL PANEL FOR RAILWAY TRAFFIC CONTROLLING SYSTEMS
Filed May 19, 1959   5 Sheets-Sheet 4

FIG. 12. BACK OF LAMP UNIT LU FOR PIA

FIG. 10. FRONT OF LAMP UNIT LU FOR PIA

FIG. 11. FRONT OF LAMP UNIT LU WITH METAL BLOCK 66 REMOVED

INVENTOR.
C.T. JACKSON
BY
Forest B. Hitchcock
HIS ATTORNEY

Sept. 25, 1962 C. T. JACKSON 3,056,121
CONTROL PANEL FOR RAILWAY TRAFFIC CONTROLLING SYSTEMS
Filed May 19, 1959 5 Sheets-Sheet 5

FIG.14. FRONT OF LAMP UNIT LU FOR PIB

FIG.15. FRONT OF LAMP UNIT LU FOR PIC

FIG.16. FRONT OF LAMP UNIT LU FOR PID

FIG.17. BACK OF TRACK SECTION PLATE PIA

INVENTOR.
C.T. JACKSON
BY
*Forest B. Hitchcock*
HIS ATTORNEY

United States Patent Office 3,056,121
Patented Sept. 25, 1962

3,056,121
CONTROL PANEL FOR RAILWAY TRAFFIC
CONTROLLING SYSTEMS
Carlton T. Jackson, Sunnymead, Calif., assignor to General Railway Signal Company, Rochester, N.Y.
Filed May 19, 1959, Ser. No. 814,322
17 Claims. (Cl. 340—225)

This invention relates in general to railway traffic controlling systems and more particularly relates to a control and indication panel for such systems.

In railway signalling practice it is common procedure to control the traffic over a particular division or track section from a central control tower. The particular track section to be controlled may consist of a plurality of tracks having crossovers, sidings and the like, over which traffic may be permitted in both directions over the same track at different times. The necessary light signals and switch machines are provided to route the trains in accordance with the operator's controls.

The control tower is usually provided with a control machine having a control panel on which is simulated the actual track diagram of the section of track to be controlled. Suitable control buttons and indication lights are also mounted on the panel to facilitate the operation of the outlying track switches and the like when lining up a train route.

In the normal operation of railway route interlocking systems of this type, when the control tower operator is advised of the approach of a train into the territory controlled by his machine, he lines up a route for the train by operating certain of the entrance and exit control buttons on the panel. When clear conditions exist, the train route will be indicated on the panel track diagram by a series of spaced end to end linear light sections which will display white light to essentially form a continuous white line the entire length of the route. As the train proceeds over the route from one block section to another, the corresponding linear light section on the panel will change its white light indication to a red light indication, thus showing the exact location of the train on the panel at all times. After the train has passed through a particular track section, the red light is extinguished and that particular track section is then available for use in lining up a following train route.

Such a railway traffic controlling system has been shown and described in detail in the patent to T. J. Judge, No. 2,298,946, dated October 13, 1942. From the illustrations shown in the above mentioned patent and from the general description given thus far, it can be seen and understood that each individual control panel must be made up to correspond to the particular sections of track which it is intended to govern. As the nature of these track layouts vary considerably at different locations, each control panel is a special assembly and is not universal in use. Furthermore, an eventual change in the track layout could render the control panel virtually obsolete.

With the above conditions in mind, the present invention proposes the assembly of a control panel which can be built up from standard modules to any length, height and form of track layout desired. Furthermore, the modules can be shifted to different positions to change the track layout on the panel, or they may be added or removed as desired. Provision is also made whereby a change of the face plate only of the module and relocation of the indication lamps will produce a different track indication on the control panel.

More specifically, the main body portion of the control panel comprises a plurality of metallic channel sections mounted upright and side by side. Each channel is mounted in the housing so that the web section of the channel faces the front of the panel. The number of channel sections is determined by the length of the track layout whereas the height of the channel sections is determined by the number of tracks. Each channel section is provided with squared apertures on its face portion, one aperture for each longitudinal track. The modules are mounted within the channel section from the rear and extend through the apertures in the channel section, and are held in position by means of spring clips. Face plates, each containing a certain portion of the track diagram, are then snapped into place against the face portion of the channel section and the light unit of the module.

Individual push button switches with indication lamps are also mounted on similar size blank face plates and are adapted to be mounted in certain apertures in the channel sections as required. Where no track sections, lamps, or switches are needed, blank face plates are mounted in the apertures to complete the make up of the front face of the control panel. The face plates are all of the same size and the front face of the control panel, when completed, presents an appearance similar to a tiled wall section, with the full track diagram clearly outlined on certain face plates.

The modules are all alike and are constructed for universal use. Each unit comprises a molded insulation base portion and a die cast aluminum face portion suitably fastened together. The base portion is provided with a plurality of lamp sockets suitably spaced and located so that lamps may be inserted in certain of the sockets to correspond to the linear light sections in the corresponding face plate. The aluminum face portion acts as a spacer between the base portion and the metallic channel piece to which it is mounted and also serves as a lamp shield and a means of dissipating the heat generated by the lamps.

The face plates containing partial sections of the track layout are a molded product made of an opaque plastic material. The front side of these molded face plates is provided with inserts inlaid therein which form the outline of the track diagram. These inserts are alternately spaced translucent and opaque linear portions, the translucent sections permitting light rays to show therethrough when the lamps are lighted. The opaque sections are of a different color than the face plate and serve to indicate the separate tracks, turnouts and crossovers or the like. As previously mentioned, when the translucent linear sections are lighted up, they serve to indicate the route of the train over the various tracks, crossovers and the like.

These face plates are made up in several distinct forms, each form having its own particular track layout inlaid thereon. These various forms incorporate straight through sections of track, a section of track having a right hand turnout, a section of track having a left hand turnout, a section of track having a complete crossover, or any other form of track section desired. By placing the appropriate forms end to end the panel track diagram can thus be built up in sectional form to simulate the actual track layout which is to be controlled.

The mode of assembly of the structure of the present invention is quite versatile in that the channel section may be mounted directly in the housing and the modules, switches, etc. added thereto; or, the modules, switches, etc. may be previously mounted in the channel sections and the complete assembled channel section may then be mounted in the housing. Similarly, a complete assembled channel section may be removed for changes or repairs, or if desired, each individual module, switch or the like may be removed separately from the channel section without first removing the channel section from the housing.

Other objects, purposes and characteristic features of the present invention will be apparent as the detailed description progresses with reference to the accompanying drawings wherein like reference characters refer to like parts and in which.

Figure 1:
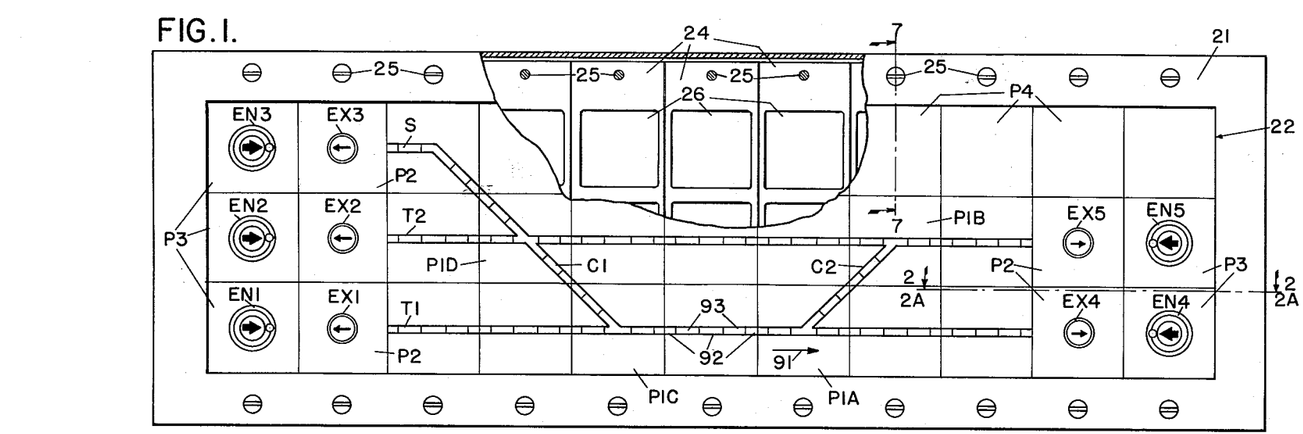
FIG. 1 is a front plan view of the control and indication panel of the present invention and is partly broken away to show the channel members and the openings therein.

Referring now more particularly to FIG. 1 of the drawings, there has been shown by way of example a panel constructed in accordance with the present invention to illustrate a track layout comprising two single tracks T1 and T2, a siding S and two crossovers C1 and C2. There has also been illustrated three entrance control switches EN1, EN2, EN3 and three exit control switches EX1, EX2, EX3 at the left hand end of the track layout whereas at the right hand end of the track layout there has been illustrated two entrance control switches EN4, EN5 and two exit control switches EX4 and EX5.

The complete panel assembly is shown in detail in FIGS. 1–8 of the drawings and comprises a metal housing 21 having a front opening 22 and a rear opening 23. Mounted within the housing 21 directly behind the front opening 22 is a series of channel shaped members 24. These channel members 24 are disposed in an upright position side by side and are held in place by means of screws 25, thus completely closing in the front opening 22 of the housing 21. Each of the channel members 24 is provided with square apertures 26 in its front wall which are located one above the other. In the present illustration there are three such apertures required per channel member, one for each linear line of track section on the panel.

In this connection it should be understood that the height of the channel members 24 is determined by the number of tracks used in the track layout and the number of channel members used is determined by the length of the track layout. The size of the housing 21 is determined accordingly.

The lamp units LU, which are referred to in more detail hereinafter, are uniformly square in end cross section and are assembled into the channel members 24 from the rear in any one of four ninety degree rotary positions. One of these lamp units LU is assembled into each aperture 26 wherein it is positioned behind a track section face plate referred to hereinafter. Each lamp unit LU is provided with raised pads 27 in two of its diagonally opposite corners which center the lamp unit LU in its respective square aperture 26.

Each lamp unit LU is held in position within its associated channel member 24 by means of two spring clips 28. These spring clips 28 are of flat resilient material which is formed substantially in a U shape with its two ends biased apart. The two ends are provided with T-shaped heads 29 (see FIGS. 3 and 4). The four side surfaces of the lamp unit LU are each provided with a recessed cavity 30 to house the spring clips 28 and the two side walls of the channel member 24 are each provided with a hole 31 therethrough to receive the T-shaped head 29 of one end of the spring clip 28. The other end of the spring clip 28 bears against a beveled surface 32 formed on the one side of the recessed cavity 30.

Figure 3:
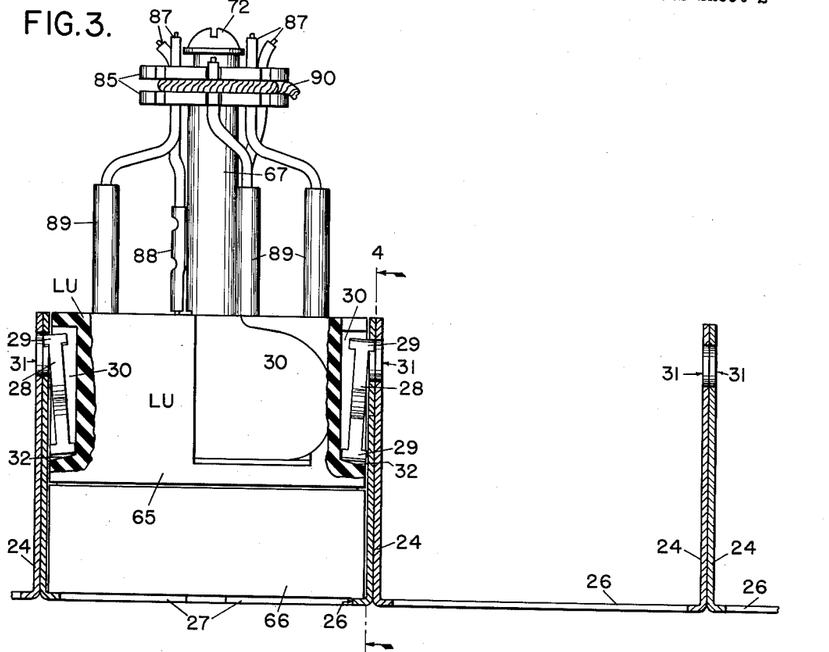
FIG. 3 is an enlarged sectional view of the module shown in FIG. 2A and more clearly shows the method of mounting the module in one of the channel members.
Figure 4:
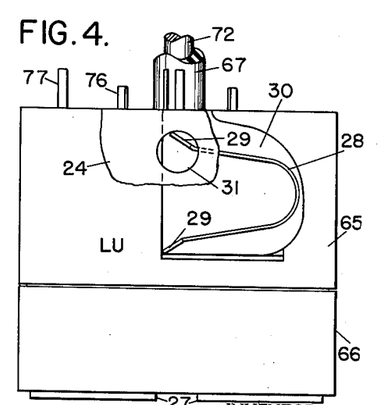
FIG. 4 is a partial side view of the module shown in FIG. 3 to show the spring clip means for retaining the module within the channel member; the view being taken substantially on the line 4—4 of FIG. 3.

In assembly, the spring clips 28 are placed into their respective recesses 30 as the lamp unit is being slid into position within the confines of the channel member. By means of a screw driver or other suitable tool, the one T shaped head 29 is then forced inward against the force of the spring clip 28 until its edge is opposite the hole 31 in the side of the channel member 24, whereupon the spring clip 28 tilts on its other end on the beveled surface 32 and the projection on the T shaped head 29 above referred to enters the hole 31. Thus, the lamp unit LU is held in position in its associated aperture 26 under bias. The recesses 30 are provided on all four sides of the lamp unit LU to facilitate mounting when the lamp unit is turned ninety degrees in either direction.

Each lamp unit LU has a track section face plate P1 mounted thereon from the front side of its associated channel member 24, as for example the face plate P1A shown in detail in FIGS. 5, 6, 17 and 18. The face plate P1A is made up of a molded plastic material and is provided with a raised pad 35 (see FIG. 17) which extends across the back surface thereof diagonally from one corner to another. This pad extends into the aperture 26 formed in the channel member 24 and serves to center the face plate therein. The other two corners of the face plate P1A are provided with stud inserts 36 molded therein, each stud 36 having a self locking ring 37 pressed thereon. As shown more clearly in FIGS. 5 and 6, each lamp unit LU is provided with a socket 38 in its two corners which have the raised pads 27 thereon, these two sockets 38 each house a U-shaped spring clip 39, the ends of which are biased towards each other. When the face plate P1A is pressed against the lamp unit LU, the self locking ring 37 cooperates with the spring clip 39 to hold the face plate P1A against the outer surface of the channel member 24 under bias.

The face plates P2 which carry the exit push button switches EX1 to EX5 inc. are of the same size and the same material as the face plates P1. However, there are no track section diagrams thereon and they are provided with a hole therethrough for mounting their respective push button switch, as shown for example in FIG. 2A. The exit push button switch EX4 is of the ordinary spring biased plunger type having a contact ring 40 thereon which bridges a pair of contact fingers 41 when its plunger head 42 is depressed. The body 43 of the switch EX4 is mounted to a box-like bracket 44 by means of a threaded bushing 45. The bracket 44 sets within the confines of the channel member 24 and the face plate P2 is located against the outer surface of the channel member 24 to cover the aperture 26. Both the bracket 44 and the face plate P2 are clamped to the channel member 24 by means of a threaded bushing 46 which passes therethrough and a nut 47.

Figure 2:
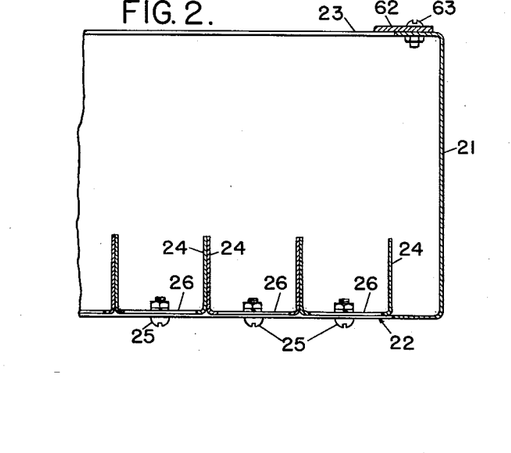
FIG. 2 is a top sectional view of part of the apparatus shown in FIG. 1 and is taken substantially on the line 2—2 of FIG. 1 looking in the direction of the arrows and particularly shows the mounting and location of the channel members within the housing, the entrance control switch, the exit control switch and the modules being omitted for clearness.
Figure 2A:
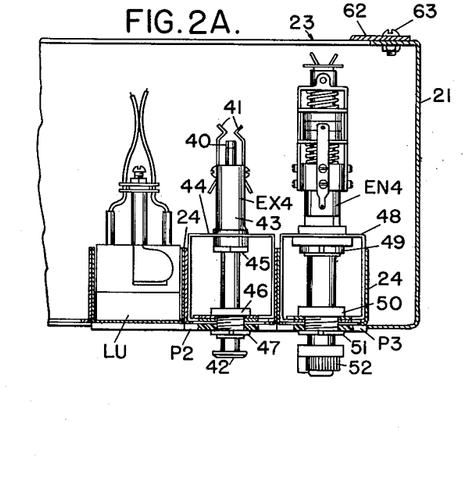
FIG. 2A is a view similar to FIG. 2 except that it shows an entrance control switch, an exit control switch and one of the modules mounted in position within the channel members.

Similar face plates P3 are provided to carry the entrance control switches EN1 to EN5 inc. As shown in FIG. 2A, the control switch EN4 is of the push, pull, turn left and turn right variety such as shown and described in detail in the patent to J. F. Merkel, No. 2,305,185, dated December 15, 1942. This control switch EN4 is also mounted in the channel member 24 by means of a box-like bracket 48 to which it is attached by a threaded bushing 49. The bracket 48 and the face plate P3 are in turn attached to the channel member 24 by means of a threaded bushing 50 and a nut 51, the face plate P3 covering the aperture 26 and the control knob 52 of the control switch EN4 extending outside of the casing 21.

Figure 7:
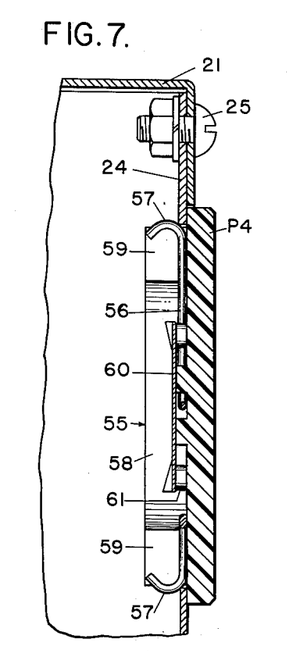
FIG. 7 is a side sectional view taken on the line 7—7 of FIG. 1 looking in the direction of the arrows and shows the method of retaining a blank face plate within one of the squared apertures in the channel member.
Figure 8:
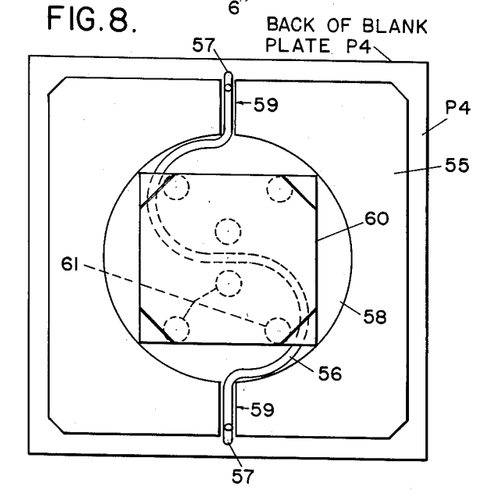
FIG. 8 is a rear plan view of the blank face plate, shown in FIG. 7 and illustrates the spring clip holding means and the mounting therefor.
Figure 9:
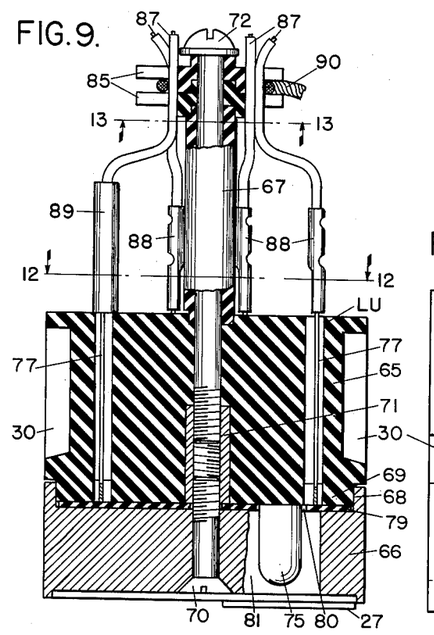
FIG. 9 is a top sectional view showing the assembly of a typical module lamp unit of the present invention as is shown taken substantially on the line 9—9 of FIG. 10 as viewed in the direction of the arrows.

The remaining apertures 26 in the channel members 24 are each covered with a blank face plate P4 which is held into position by a snap spring device such as shown in FIGS. 7 and 8. These blank face plates P4 are also a molded plastic product and each plate is provided with a raised pad 55 on its inner surface. This raised pad 55 extends into the aperture 26 when assembled and centers the plate P4 into position in the aperture 26. The snap spring holding device comprises a resilient wire spring 56 formed into a substantial S shape having upturned hook ends 57 at its two extremities. This wire spring 56 is positioned flat against the bottom of a recess 58 formed in the center of the raised pad 55 and its hooked ends 57 each lie in a groove 59 formed in the raised pad 55 and protrude endwise therefrom. A square retainer plate 60 is pressed into the round recess 58 until it bears against the upraised bases 61 and serves to hold the spring 56 in position. This retainer plate 60 is made of resilient tempered steel and bends at its corners when in position, thus tending to bite into the plastic side walls of the recess 58 to prevent removal.

As shown more particularly in FIG. 7, when the face plate P4 is pressed into position into the aperture 26, the hooked ends 57 of the spring 56 will contact the edges of the aperture 26 and will be forced inward toward each other against the outward bias of the spring 56 to the extent that the hooked ends 57 will pass through the aperture 26. Once the face plate is in position against the outer surface of the channel member 24, the outward bias of the spring 56 will permit the hooked ends 57 to spring outward behind the edges of the aperture 26 and hold the face plate P4 in position.

From the description thus far given in connection with the drawing illustrations, it should be seen and understood that the control panel of the present invention comprises a simple box-like framework having rows of openings in its front wall into which modules of the proper character are inserted to form a track diagram, and controls therefor of a desird nature are also inserted in proper relationship to the track diagram. All of the modules and the control switches have their various electrical contact fingers and the like extending towards the rear of the panel structure to facilitate making wiring connections. The box-like framework may have its rear opening 23 covered with a cover plate 62 held on by means of screws 63 or by some other suitable manner. Openings (not shown) are provided for the passage of external wires. In the apertures 26 where no modular units are required, blank face plates P4 are snapped into position to complete the smooth and finished front panel surface.

With reference to the assembly of the units as described above, it should be understood that if desired, the various module lamp units LU, the entrance control switches EN1 etc., and the exit control switches EX1 etc., may all be assembled in their respective channel shaped members 24 prior to the mounting of the channel shaped members 24 into the housing 21. The various face plates P1 etc. would of course be fastened to their respective units after the channel members 24 were in place in either form of assembly.

Referring now to the structure of the modules which serve to formulate the desired track diagram, one such unit has been shown in detail in FIGS. 9–20 inc. of the drawings. As previously mentioned, each module comprises a lamp unit LU which is mounted from the rear of a channel member 24 and a track section face plate P1 which is mounted from the front of a channel member 24.

The lamp unit structure LU is composed of a molded insulation block 65, a die cast aluminum block 66 and a post structure 67 for positioning or dressing the electrical wire leads near their terminal connectors. The insulation block 65 serves as a lamp receptacle whereas the aluminum block 66 houses the bulb portion of the lamps in a manner whereby they are individually separated by partitions. The aluminum material also acts as a good heat dissipator. In assembly, the aluminum block 66 is provide with a square recess 68 (see FIG. 9) on its inner surface which registers with a square raised pad 69 on the insulation block 65. The two parts are held together by means of a screw 70 which threads into a bushing 71 which is molded into the insulation block 65. The post structure 67 is also fastened to the insulation block 65 by means of a screw 72 which is threaded into the bushing 71. A key and keyway joint between the two parts prevents the post 67 from turning while the screw is being tightened and thereafter aids in maintaining its position.

Figure 18:
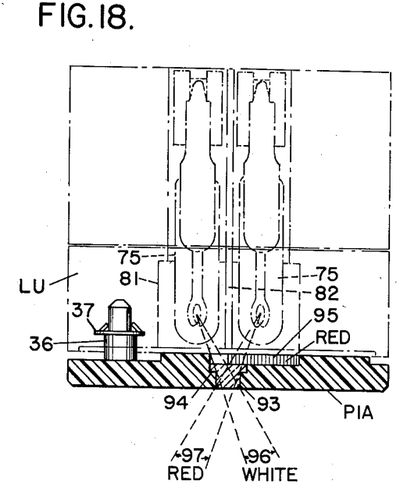
FIG. 18 is a sectional view of the face plate shown in FIG. 17 and is taken substantially on the line 18—18 of FIG. 17 as viewed in the direction of the arrows, and also shows a pair of lamps indicated by dot and dash lines, and dashed lines to indicate the beam sector paths of light from a point source through the translucent and transparent inserts in the face plate.
Figure 20:
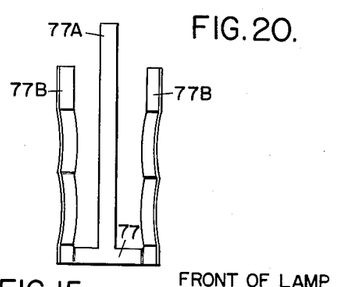
FIG. 20 is a detail view of one of the contact spring fingers located in the lamp sockets.

The insulation block 65 is also provided with numerous octagon shaped holes 73 and round holes 74 therethrough to accommodate the lamps 75 and the various spring contact fingers respectively which supply current to the lamps. These holes are arranged so that the lamps 75 may be positioned in pairs, one pair of lamps being positioned behind each linear translucent lighting strip in the face plates P1 as shown in FIG. 18, the purpose of which will be explained hereinafter.

As shown more in detail in FIGS. 11, 12, 19 and 20, each pair of lamps 75 has a separate contact finger 76 to supply the current feed to the lamp and a double contact finger 77 to provide a common return. The contact finger 76 has one prong 76A which passes through a round hole 74 and another prong 76B which passes through an octagon shaped hole 73 and lies against one side thereof, three prongs being integrally joined together at their bottom ends. The other contact finger 77 has one prong 77A which passes through a round hole 74 and two other prongs 77B each of which pass through a separate octagon shaped hole 73 and lie against one side thereof, all three prongs being integrally joined together at their bottom ends. The lamps 75 are of the so called bayonet type or the like which have their contact connectors 78 on either side thereof. When a lamp 75 is pushed into its socket opening 73, its contact connectors 78 will register with the contact prong 76B and one of the contact prongs 77B to complete a circuit from the contact prong 77A, through the lamp 75 to the common return contact prong 77B. A piece of insulation material 79 is inserted between the insulation block 65 and the aluminum block 66 during assembly to insulate the bottom portion of the contact fingers 76 and 77 from the aluminum block 66. Holes 80 are provided therein to permit passage of the lamp 75 therethrough.

With the lamps 75 positioned in their socket openings 73 as just described, their glass bulb portions and filaments will protrude into openings 81 formed in the aluminum block 66. These various openings 81 correspond in position to the various octagon shaped socket openings 73 in the insulation block 65. A barrier 82 lies between each of the lamps in a pair. This permits a maximum of air space around the lamps and prevents light reflection from one opening 81 to another. Also, this barrier 82 which is a thin wall partition allows rapid heat radiation. Two holes 83 are provided in the bottom of each of the sockets 38 to accommodate the mounting of the spring clips 39 which pass therethrough. These clips 39 are held in position by reason of having their base portions clamped between the insulation block 65 and the aluminum block 66 and, as previously mentioned, they provide a means for holding the face plate P1 in position against the lamp unit LU.

The post structure 67 is a hollow cylindrical shape and is made of a suitable insulating material. As previously mentioned, this post is suitably keyed to the insulation block 65 and extends backward from the face of the panel. Two suitably spaced and keyed bushings 85 are mounted on top of the post 67 and are held in place by the screw 72 which passes therethrough, which is fastened into the metal bushing insert 71 located in the insulation block 65 as previously mentioned. The two bushings 85 are each provided with several radial slots 86 extending inward from their outer periphery. In assembly, the external wires 87 are provided with connectors 88 which are connected to the tips of the various lamp contact fingers 76 and 77. The connectors 88 are then covered with insulating sleeves 89. The external wires 87 pass through the radial slots 86 and are tied to the post 67 by a wrap around cord 90.

Referring now to the structure of the track section face plates P1 previously mentioned, there has been chosen, by way of example, the face plate P1A shown in FIG. 1 and illustrated more in detail in FIGS. 5, 6, 17 and 18. This particular face plate P1A is provided with a track section representing part of a main track T1 and a portion of a left hand crossover C2, assuming traffic to be in the direction of the arrow 91. As previously mentioned, the face plate itself is a molded plastic form having alternate opaque and translucent inserts molded therein to simulate the track layout and the route of the train. The opaque linear inserts 92 are of a dense colored plastic material, such as yellow, and serve to indicate the track layout. The translucent linear inserts 93 are of a neutral plastic material and serve to indicate the train route when illuminated. The opaque inserts 92 may be of a thin strip material merely inlaid on the surface of the face plate P1A whereas the translucent inserts 93 extend completely through the face plate P1A and into a recessed portion 94 on the back thereof. Pieces 95 of relatively clear red colored plastic material are cemented on the bottom of the recessed portion 94 in such a position as to half cover each translucent linear insert 93.

As mentioned hereinbefore, when the face plate P1A is snapped into position over its respective lamp unit LU, a pair of lamps 75 separated by a partition 82 will be associated with each translucent linear insert 93. The relative position of each pair of lamps 75 with respect to their associated translucent insert 93 has been shown in FIGS. 17 and 18, the lmps 75 and the partition 82 being indicated by dot and dash lines. It can thus be seen that the light rays from one lamp 75 when lighted are directed through the translucent insert 93 as shown by the dashed lines 96 to transmit a white light indication on the front of the face plate P1A whereas the light rays from the other lamp 75 when lighted are directed through the red colored piece 95 as shown by the dashed lines 97 to transmit a red light indication on the front of the face plate P1A.

Figure 5:
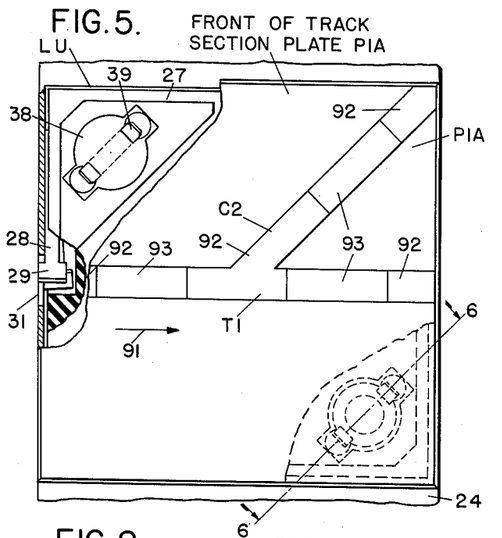
FIG. 5 is a front view of the module lamp unit as shown in FIG. 3 and its associated track section face plate and is shown partly in full and partly broken away and in section and dotted lines to more fully illustrate the spring clip retaining means for both the lamp unit and the face plate.
Figure 6:
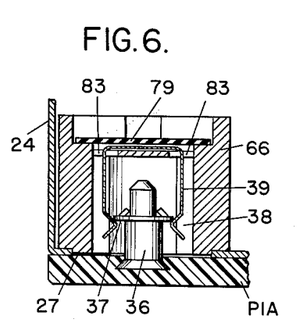
FIG. 6 is a sectional view taken on the line 6—6 of FIG. 5 looking in the direction of the arrows and more fully shows the spring clip means for retaining the face plate to the lamp unit.
Figure 10:
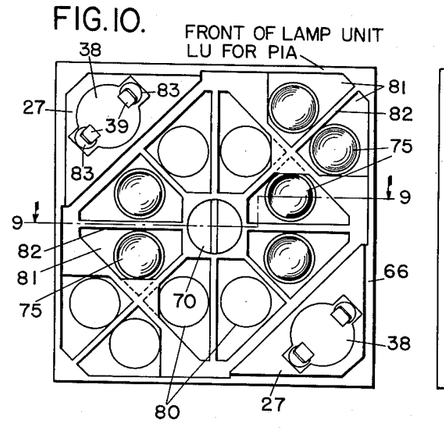
FIG. 10 is a front view of the apparatus shown in FIG. 9 and shows mainly the die cast aluminum block end of the module lamp unit with the lamps arranged to accommodate a track section face plate as illustrated in FIG. 5.
Figure 11:
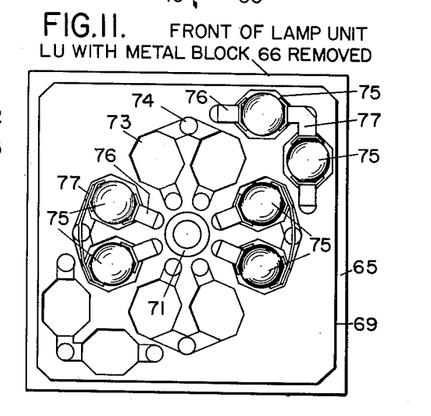
FIG. 11 is a front view of the molded insulation block end of the module lamp unit shown in FIG. 9 as viewed with the die cast aluminum block removed.
Figure 12:
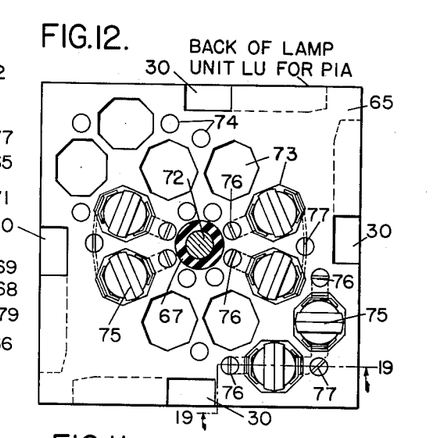
FIG. 12 is a back view of the module lamp unit shown in FIG. 9 and is shown partially in section as indicated by the line 12—12 of FIG. 9 as viewed in the direction of the arrows.
Figure 13:
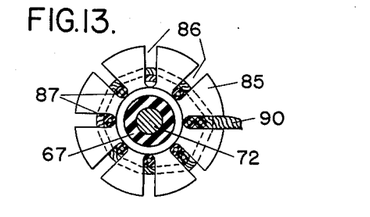
FIG. 13 is a sectional view showing the structure of the wire dressing post end of the module lamp unit as indicated by the line 13—13 of FIG. 9 as viewed in the direction of the arrows.
Figures 14, 19:
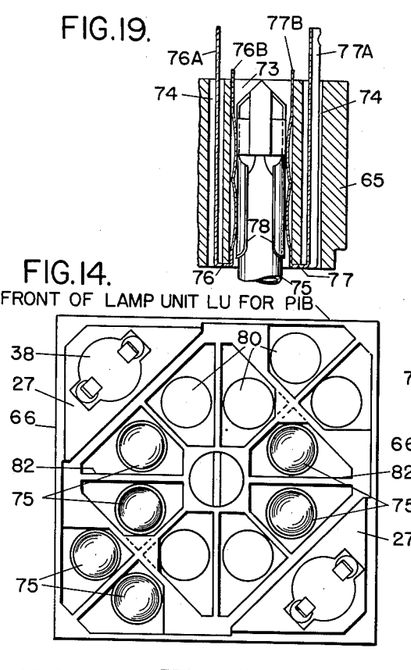
FIGS. 14, 15 and 16 are views similar to FIG. 10 and show the front of typical module lamp units with the lamps arranged to accommodate other forms of track diagram face plates.
FIG. 19 is a sectional view taken through one of the lamp sockets of the module lamp unit as indicated by the line 19—19 of FIG. 12 as viewed in the direction of the arrows.
Figure 15:
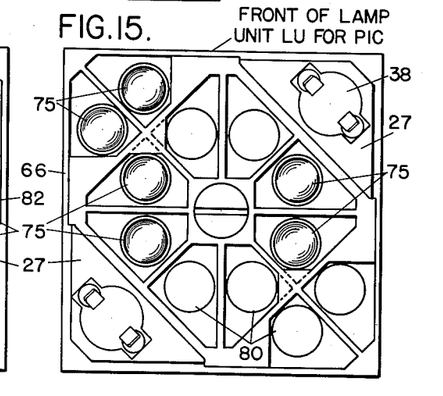
Figure 16:
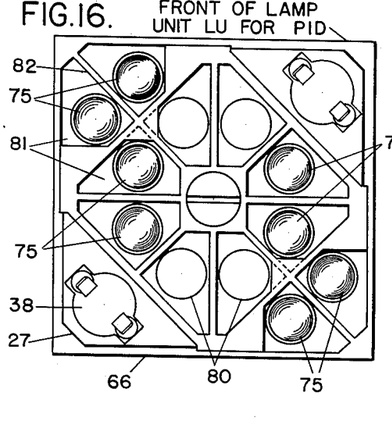
Figure 17:
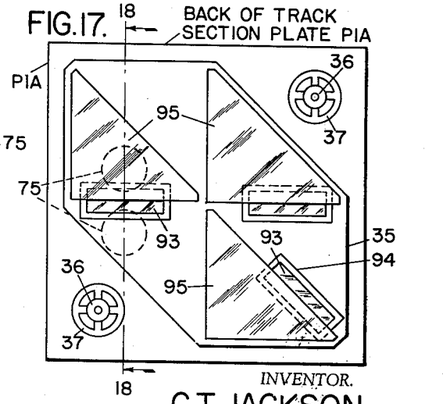
FIG. 17 is a back view of a typical track diagram face plate of the present invention and shows the transparent red mask pieces partially covering the neutral translucent inserts.

With reference now to FIGS. 5 and 10, it can be seen that each lamp unit LU is provided with sockets to accommodate twelve lamps but only six such lamps 75 are used. These six lamps 75 are so placed in pairs that there will be a pair of lamps 75 behind each translucent linear insert 93 in the face plate P1A. Thus it can be seen that the lamp units LU are versatile in use so that a combination can be made up to fit a face plate having any desired track section combination thereon. For example, FIG. 14 shows the lamp combination which would be used for the track section face plate P1B shown in FIG. 1. FIG. 15 shows the lamp combination which would be used for a track section face plate such as P1C of FIG. 1. Similarly, the track section face plate P1D of FIG. 1 would require a lamp combination such as shown in FIG. 16, eight lamps 75 being required.

Also, it can be seen and should be understood that most of the complete assembled modules are versatile in use because either the lamp units or face plates or both may be used in various places on the track layout merely by mounting in positions which can be turned either ninety or one hundred and eighty degrees from the positions shown in FIG. 1. For example, the modules containing the face plates P1A and P1B are interchangeable merely by remounting the whole unit by turning it one hundred and eighty degrees on a central axis through its face plate. In other instances, the lamp unit may be left intact and used to accommodate another face plate merely by repositioning the lamps 75 and changing the wire connectors on the rear of the lamp unit to correspond. As both the lamp units LU and the face plates P1 etc. are snapped into position under spring bias, this is very easily accomplished.

In summary then, it is particularly advantageous in an economical respect to have available a versatile element by means of which a control and display panel for a railroad system may be constructed. Such versatile elements, once installed, may readily be altered accordingly as the actual track is altered. Furthermore, by having such standard elements available as building blocks, new additions to a track layout can readily be accomplished at a minimum expense. It is also considered advantageous to provide a method of assembly whereby the channel member complete assemblies may be removed as a whole to facilitate making changes or repairs to the modules, switches and the like mounted therein.

Having shown and described one complete form which the present invention could assume, it is desired to be understood that modifications could be made in both the panel structure and structure of the modular units, all without deviating from the spirit of the invention or the scope of the appending claims.

What I claim is:

1. In combination, a control and indication panel for railway traffic controlling systems having a miniature track diagram and control switches displayed thereon, a housing having an opening in its front wall thereof, a plurality of adjacent vertically mounted channel shaped members located within said housing and covering said opening, a plurality of squared apertures in the front wall of each of said channel members, squared face plates mounted within said squared apertures to form the front surface of said panel, certain of said face plates having appropriate track sections thereon to comprise said track diagram, and certain other of said face plates having switches mounted thereon for controlling traffic over said traffic controlling system, and lamp units mounted within the confines of said channel shaped members and disposed behind said certain face plates which have track sections displayed thereon.

2. In combination, a control and indication panel for railway traffic controlling systems having a miniature track diagram and control switches displayed thereon, a housing having a plurality of adjacent vertically mounted channel shaped members therein, a plurality of squared apertures in the front wall of said channel members located adjacently one above another, lamp units secured within the confines of said channel members and positioned within certain of said squared apertures on the back surfaces of said channel member front walls, face plates, certain of said face plates being secured to said lamp units and positioned within said squared apertures on the front surfaces of said channel member front walls, said certain face plates each having a portion of said miniature track diagram displayed on its front surface, certain other of said face plates having blank front surfaces or having control switches mounted thereon and being secured within said remaining apertures in said channel shaped members.

3. A control and indication panel according to claim 2 in which said lamp units are snap spring held within said channel members and said associated track section face plates are snap spring held to said lamp units.

4. A control and indication panel according to claim 3 in which said lamp units may be mounted in any one of four separate rotary ninety degree positions and said associated track section face plates may be mounted with respect to said lamp units in either of two positions, each being one hundred and eighty degrees from one another.

5. A control and indication panel according to claim 2 in which said track section face plates are provided with intermittent longitudinal translucent openings therein corresponding to the track section layout thereon and in which their associated said lamp units are provided with lamps situated behind said translucent openings in said face plates.

6. A control and indication panel according to claim 5 in which a longitudinal portion of each of said translucent openings in said face plates is covered with a transparent red filter on its inner surface, and a pair of said lamps are situated behind said opening in a manner whereby one of said lamps when lighted transmits a white light indication through said translucent opening to the front of said face plate whereas the other of said lamps when lighted appears red when viewed from the front of the face plate as the light has passed through said transparent red filter.

7. A control and indication panel according to claim 5 in which each of said track section face plates comprises a molded plastic plate having a raised ridge on its back surface of a size to fit within said squared aperture in said channel member and having alternate opaque and translucent longitudinal inserts molded therein to define the track section appearing thereon.

8. A control and indication panel according to claim 5 in which said lamp units comprise a molded insulation block and a die cast aluminum block joined together, said insulation block having multiple lamp sockets therein and said aluminum block having corresponding lamp openings therein, each of said openings housing a lamp, said lamps having their bases seated in said sockets and their bulb portion extending into said openings of said aluminum block, and a wire dressing post attached to said insulation block.

9. A control and indication panel according to claim 2 in which said blank face plates are snap spring held in said squared apertures in said channel members and said control switch face plates are fixedly mounted in said squared apertures in said channel members.

10. In a modular control panel having a plurality of modules each comprising, a lamp unit assembly having therein a plurality of sockets and lamps spaced apart in pairs with contact fingers projecting from said sockets, a cable post attached to the back of said lamp unit assembly for retaining and dressing external electrical wires which are connected to said contact fingers, a face plate removably attached to the front of said lamp unit assembly and having translucent inserts therein each adapted to functionally cooperate with one pair of said lamps to provide a means whereby the light rays from said lamps are transmitted to a display figure formed on the front of said face plate.

11. The combination of claim 10 wherein said lamp unit assembly comprises an insulation block and a metal block attached together by interlocking means which prevents rotation, said insulation block housing having said lamp sockets and said contact fingers which receive the bases of said lamps, and said metal block having openings therein which receive the bulb portion of said lamps.

12. The combination of claim 11 wherein said insulation block and said metal block each have registration configurations on their associated squared faces which permits them to be attached together in either of two rotary positions, each 180 degrees from the other.

13. The combination of claim 10 wherein said face plate is attached to said lamp unit assembly by means of a snap spring clip device in either of two positions, each 180 degrees in rotation from each other.

14. The combination of claim 10 wherein said face plate is a molded plastic product and said display figure thereon is a track section layout and said translucent inserts are molded therein between spaced opaque inserts which form said track layout, said translucent insert comprising a material neutral in color and partially covered by a transparent insert having a red color.

15. A control and display panel having suitable manually operable electrical switches for controlling traffic over a railway system, and opaque panel on which is inscribed a multi-colored translucent pattern representing a section of track for indicating un-occupancy and occupancy of said track, and illumination means behind said patterned panel arranged in pairs, one of each in said pair groups responsive to said track un-occupancy and disposed with respect to said panel so that the light from said illumination means will pass through one color of said multi-colored translucent materials, the other of each of said pair groups responsive to track occupancy and disposed with respect to said panel so that light from said illumination means will pass through a different color of said multi-colored translucent materials.

16. A control and display panel for a traffic routing system comprising, a housing having an open front, a plurality of channel members each having a series of openings in the web section thereof, each of said openings uniformly separated from one another in a single row, a plurality of lamp compartment assemblies for mounting retractable lamps whose front surface of said assembly is keyed to fit into one of said openings of said channel member in any one of four 90 degree positions, spring clip means for mounting said lamp compartment inside of said channel member, a route cover plate composed essentially of an opaque material having a pattern of multi-colored sections of translucent material to form a portion of a route plan, readily detachable fastening means for mounting said cover to said lamp socket assembly in either of two 180 degree positions, a plurality of manually operable electric switch assemblies each mounted on a blank plate similar to said route cover plate, said switch assembly mounted through one of said openings in said channel member and occupying the same surface area as each of said lamp compartment assemblies, said plurality of lamp compartment assemblies, route cover plate assemblies, and a plurality of said switch assemblies assembled together to form channel member assemblies and so disposed on any one of said channel members as to form a vertical element of a route system plan, said plurality of channel member assemblies arranged side by side in said housing covering said open front to form a mosaic of route cover plates having switch assemblies disposed at the ends adjacent to each controllable track section diagram for controlling the traffic over a portion of said routing system, said assembly being arranged so that said mosaic pattern may be illuminated from behind by said lamp assemblies in a manner to indicate route clearance and traffic occupancy.

17. In an indication panel for displaying traffic conditions within a system, an elemental mosaic of an opaque material having constructed therein a multi-colored translucent pattern representing a portion of a route system, a shielded lamp compartment assembly having means for mounting a plurality of lamps in pairs, each of said pairs being shielded from one another, means for attaching said elemental mosaic to said lamp assembly in a manner such that any portion of said mosaic of a particular color may be illuminated to display a route condition by lighting one lamp of said pair of lamp groups, and another portion of said mosaic of a different color may be illuminated to display a traffic condition by lighting the other lamp of said pair of lamp groups, means for mounting a plurality of said elemental mosaics side by side and one above the other to form an overall mosaic resulting in said indication panel and representing the routes of a traffic system.

References Cited in the file of this patent

UNITED STATES PATENTS

| | | |
|---|---|---|
| 2,053,774 | Hershey | Sept. 8, 1936 |
| 2,315,420 | Harrington | Mar. 30, 1943 |
| 2,359,110 | Hudson | Sept. 26, 1944 |
| 2,591,865 | Peter et al. | Apr. 8, 1952 |
| 2,804,607 | Nalle | Aug. 27, 1957 |